April 12, 1938.  F. P. SMITH  2,114,117

PREPAYMENT GAS METER

Filed April 28, 1937  2 Sheets-Sheet 1

Inventor:
Frederick P. Smith,
By W. W. Williamson
Attorney.

April 12, 1938.  F. P. SMITH  2,114,117
PREPAYMENT GAS METER
Filed April 28, 1937  2 Sheets-Sheet 2

Inventor:
Frederick P. Smith,
By W. B. Williamson
Attorney.

Patented Apr. 12, 1938

2,114,117

UNITED STATES PATENT OFFICE 2,114,117

PREPAYMENT GAS METER

Frederick P. Smith, Glassboro, N. J.

Application April 28, 1937, Serial No. 139,464

4 Claims. (Cl. 194—3)

My invention relates to new and useful improvements in prepayment gas meters and has for one of its objects to rearrange certain parts of the well known prepayment gas meter and add elements thereto, to provide an apparatus which will compute a considerable amount of gas which might pass through the meter because of a leaky valve, and one which will precalculate and postcalculate the amount of gas used.

Another object of the invention is to provide means for permitting the calculating mechanism to operate without injury thereto after the valve is normally in its closed position, even though the same may be leaking.

A further object of the invention is to rotatably mount an arm on a hub fixed to the valve operating shaft and to provide a spring between the hub and arm which spring is of sufficient strength to cause the arm and hub and therefore the valve operating shaft to rotate in unison and to permit the arm to move against the action of the spring after the valve is closed.

A still further object of the invention is to provide a carriage having means for coaction with the spring urged arm and to provide unique means for moving said carriage longitudinally of a threaded shaft step by step in one direction.

Other objects of the invention will be more fully brought out in the following description.

With these ends in view, this invention consists of the details of construction and combination of elements hereinafter set forth and then designated by the claims.

In order that those skilled in the art to which this invention appertains may understand how to make and use the same, I will describe its construction in detail, referring by numerals to the accompanying drawings, in which:—

Figure 1:
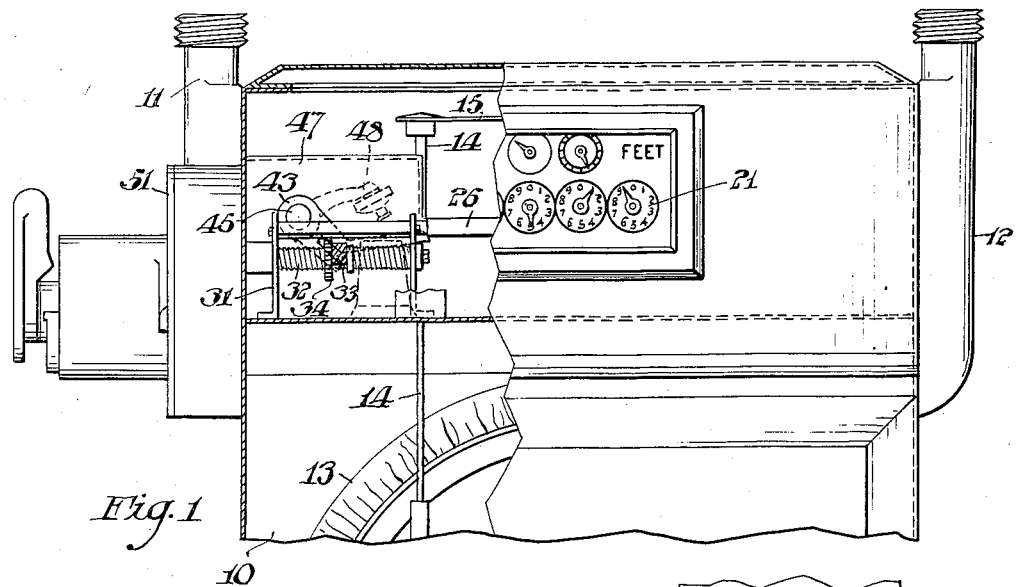
Fig. 1 is a front view of the upper portion of a gas meter partly in elevation and partly in section to illustrate my invention.
Figure 3:
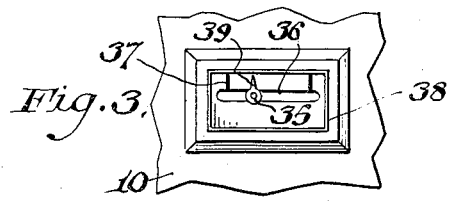
Fig. 3 is a fragmentary view of the front wall of the meter showing the dial which indicates the movement of the valve opening mechanism due to the insertion of coins.
Figure 2:
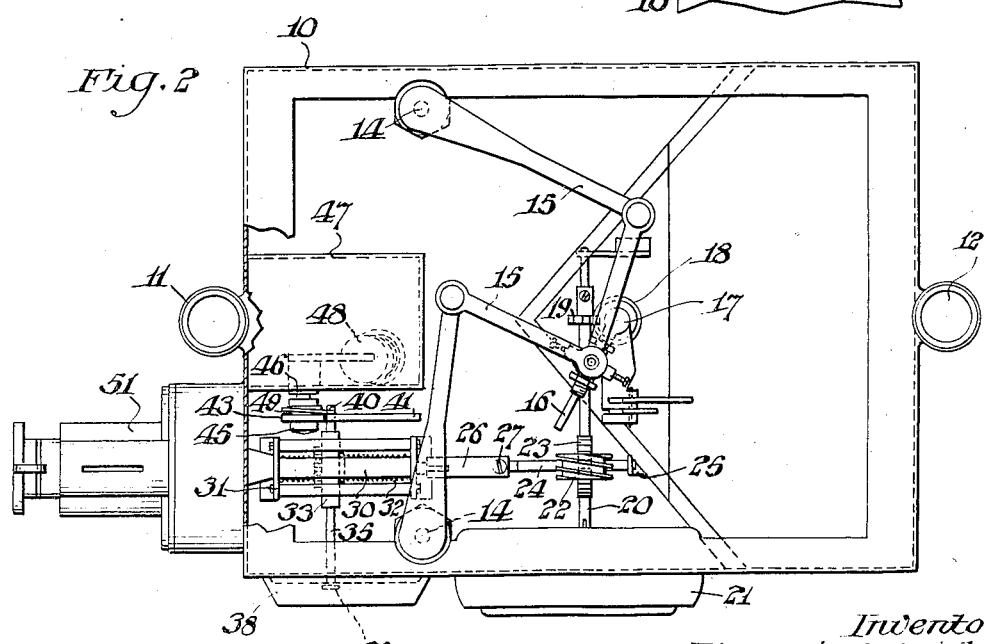
Fig. 2 is a top plan view thereof with the upper wall of the meter removed and portions of the casing broken away to clearly illustrate details of construction.
Figure 4:
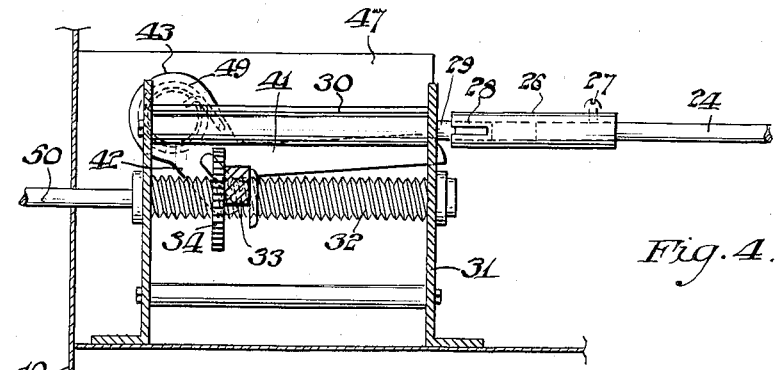
Fig. 4 is an enlarged, fragmentary, sectional elevation of the carriage and component and contiguous parts on the line 4—4 of Fig. 5.
Figure 5:
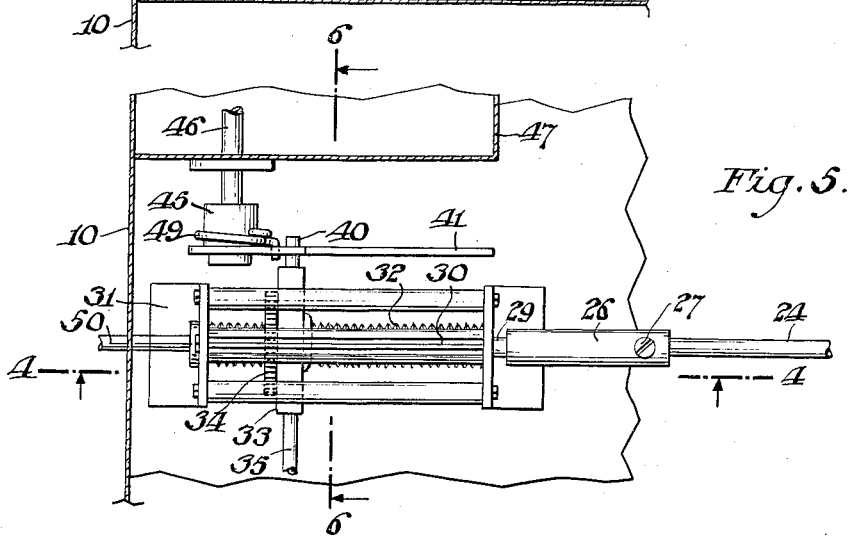
Fig. 5 is a top plan view of Fig. 4 with a portion of the valve box shown in section.
Figure 6:
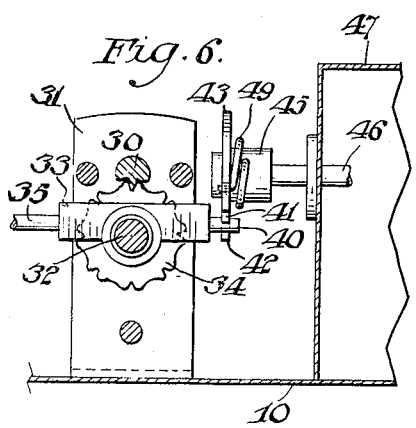
Fig. 6 is a section on the line 6—6 of Fig. 5.
Figure 7:
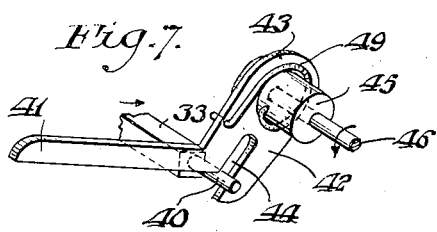
Fig. 7 is a perspective view of the valve operating arm showing its relation to the valve operating shaft and the carriage.

In carrying out my invention as herein embodied 10 represents a gas meter of any usual or well known construction having an inlet pipe 11 and an outlet pipe 12, and further provided with an ordinary diaphragm 13, Fig. 1, which transmits power and motion to the diaphragm shafts 14, these being connected by the jointed levers 15 with the crank 16 mounted upon the shaft 17. The shaft 17 carries a worm 18 which meshes with the gear 19 mounted on the index shaft 20 which is connected with the usual train of gears to the index or register 21 whereby the amount of gas used or passed through the meter is registered or indicated upon the dials of the index mechanism.

On the index shaft 20 is a worm gear 22 meshing with a gear 23 mounted on the shaft 24 of the elongated intermittent pinion. One end of this shaft 24 is journalled in a bracket 25 and on the other end is adjustably fastened a connecting sleeve 26 held in a predetermined adjustment by the set screw 27. The end of the sleeve opposite that attached to the shaft 24 is slotted as at 28 for connection to the flattened end of the intermittent pinion 30 having a single tooth and said pinion is journalled in the end pieces of a suitable frame 31. In this frame 31 is also journalled the double thread carrier shaft 32 on which the carriage 33 is mounted for movement longitudinally of said carrier shaft. This carriage is provided with a gear 34 having interior threads to mesh with the threads of the carrier shaft 32 and the teeth of said gear 34 are intermittently engaged by the single tooth of the intermittent pinion 30.

An arm 35 projects from the front end of the carriage through the usual slot 36 in the front wall of the meter on the face of which is a dial 37 enclosed in the dial box 38. On the end of the arm 35, which is within the dial box, is mounted a pointer 39.

From the rear of the carriage projects the pin 40 for cooperation with the underside of the long finger 41 and also with the short finger 42 arranged at an angle and located to the rear of the long finger 41, both fingers forming parts of the valve operating arm 43. Due to the provision of the fingers, a slot 44 is produced between the two fingers and the pin 40 enters said slot under certain conditions and for a purpose which will be presently described.

The valve operating arm is rotatably mounted on a hub 45 fixed to the valve operating shaft 46 suitably journalled in the valve box 47 within the gas meter and the inner end of said shaft 46 carries the usual valve 48 for controlling the flow of gas into and through the meter.

The valve operating arm 43 is urged in one direction, which is illustrated in the drawings as the direction that will elevate the finger 41, by a spring 49 having one end fixed to the hub 45 and with a portion coiled about said hub and the other end connected to the valve operating arm 43. This spring is so constructed that it will normally hold the valve operating arm 43 in a specific angular position relative to the valve operating shaft 46 and the finger 41 will lie in an approximately horizontal position or slightly above the horizontal position when the valve 48 is in its open position.

The double thread carrier shaft 32 is connected in the usual manner by the price wheel shaft 50 with the coin control device generally indicated at 51.

When the gas controlling valve 48 is closed upon its seat the carriage will be in close proximity to the left hand end of the frame 31 according to the illustrations in Figs. 1, 2, 4 and 5. To open said valve, the operation is as follows:—

A coin is placed in the coin control device and the latter is operated in the usual manner so as to revolve the double thread carrier shaft 32 in the proper direction to move the carriage 33 a certain predetermined distance towards the right and the movement of the carriage will cause the pin 40 to lift the long finger 41 and thereby rotate the valve operating arm 43. The hub 45 will be rotated with the arm 43 through the medium of the spring 49 and as said hub is on the valve operating shaft 46 the latter will be rotated in the proper direction to lift the valve 48 from its seat and permit gas to flow through the meter. As the gas flows through the meter, the diaphragm will be operated, thereby revolving the shafts 14 and motion will be transmitted from said shafts through the jointed levers 15, crank 16, shaft 17, worm 18, gear 19, shaft 20, gear 21, shaft 24 and the connector 26 to the elongated intermittent pinion 30, then through the gear 34 to the double threaded carrier shaft 32. During each complete revolution of the intermittent pinion 30 its single tooth will mesh with the gear 34 and rotate the latter a portion of a revolution and thereby move the carriage rearwardly or towards the left along the double threaded carrier shaft 32. When the entire amount of gas paid for is delivered, said double threaded carrier shaft will have been rotated sufficiently to cause the carriage 33 to move the pin 40 into engagement with the short finger 42 of the valve operating arm 43 which arm was rotated thereby a sufficient distance to close the valve 48.

Should the valve leak from any cause whatever, the gas which passes said valve will pass through the meter to any gas consuming device and the mechanism will be operated so that the carriage 33 will continue to move rearwardly or towards the left and thereby rotate the valve operating arm 43 against the action of the spring 49 and relative to the hub 45 and the valve operating shaft 46, thereby permitting a considerable movement of the parts without disengaging or damaging any member of the meter or the operating mechanism.

When the pressure of the carriage pin 40 upon the short finger 42 is relieved by the insertion of the necessary number of coins, the valve operating arm will be returned to its normal position by said spring 49 and thereafter the valve operating arm 43, the hub 45 and the valve operating shaft 46 will rotate in unison.

When because of any leaking in the valve 48, the mechanism of the device has been moved to the position above described, or, in other words, when the valve operating arm 43 is rotated against the action of the spring 49 and independent of the valve operating shaft 46 beyond its normal position, said normal position being termed the zero position, and a coin is then inserted in the device, the carriage will be moved forward a predetermined distance and if that part of the gas used is equal to the amount that can be purchased for the first coin, then the insertion of said coin will move the carriage only to the point that will return the valve operating arm to the zero position, but will not open the valve 48. Thus the device has post calculated the amount of gas used and it is necessary to insert an additional coin before the valve 48 will be opened.

Upon the insertion of the additional coin and the operation of the coin control mechanism, the carriage 33 will be moved further forwardly and through the medium of the pin 40 the valve operating arm 43 will be rotated sufficiently to open the valve 48 and this will precalculate the amount of gas to be used.

After the valve 48 has been opened, as above set forth, the gas flowing through the meter will cause the intermittent pinion 30 to operate the parts as previously described and cause the carriage to move rearwardly step by step until the pin 40 engages the short finger 42 to rotate the valve operating arm 43 and shaft 46 in the proper direction for closing the valve 48.

Of course I do not wish to be limited to the exact details of construction herein shown and described as these may be varied within the scope of the appended claims without departing from the spirit of my invention.

Having thus described my invention, what I claim as new and useful is:—

1. The combination with a gas meter having a diaphragm operated mechanism and provided with a valve, of a shaft to which said valve is connected, a valve operating arm journalled on said shaft and provided with long and short fingers, a spring to urge said arm in one direction and permit movement in the opposite direction independent of the shaft in opposition to the action of said spring, a double thread shaft to be rotated by a coin control device, a carriage on said double thread shaft to be moved rearwardly by the rotation of the latter, means actuated by the diaphragm operated mechanism to move the carriage forwardly, and a pin on the carriage for cooperation with the long finger to open the valve and for cooperation with the short finger to close said valve and also rotate the valve operating arm on the valve operating shaft after the valve is closed and due to leakage through said valve.

2. The structure in claim 1 wherein the means actuated by the diaphragm operated mechanism to move the carriage forwardly includes a gear having threaded connection with the double thread shaft and an elongated single tooth intermittent pinion.

3. The combination with a gas meter having a diaphragm operated mechanism and provided with a valve, of a shaft to which said valve is connected, a hub fixed to the outer end of said shaft, a valve operating arm journalled on said hub and provided with long and short fingers, the latter being at an acute angle to and to the rear of the former, means to permit a limited movement of said arm in one direction independent of the hub and valve operating shaft, a carriage, means on the carriage for coaction with the fingers, means governed by a coin control device to move the carriage forwardly and cause the means on said carriage to engage the long finger to rotate the arm and thereby transmit an opening movement to the valve, and means actuated by the diaphragm operated mechanism to intermittently move the carriage rearwardly and cause said means on the carriage to engage the short finger to rotate the arm and thereby transmit a closing movement to the valve.

4. The combination with a gas meter having a diaphragm operated mechanism and provided with a valve, of a shaft to which said valve is connected, a hub fixed to the outer end of said shaft, a valve operating arm journalled on said hub, a spring having one end fixed to the hub and the other end attached to the arm and maintaining said arm in a neutral position and of sufficient strength to cause the arm and the valve and component parts to move in unison until the valve is closed and thereafter permitting the arm to move against the action of said spring independently of the valve and component parts, means for actuating the arm to close the valve and receiving its movement from the diaphragm operated means, and means governed by a coin control device whereby the arm actuating means may be moved in a direction to open the valve.

FREDERICK P. SMITH.